(12) United States Patent
Choi et al.

(10) Patent No.: US 10,015,792 B2
(45) Date of Patent: Jul. 3, 2018

(54) ELECTRONIC DEVICE AND METHOD FOR AVOIDING INTERFERENCE BETWEEN FREQUENCIES THEREFOR

(71) Applicant: SAMSUNG ELECTRONICS CO., LTD., Suwon-si, Gyeonggi-do (KR)

(72) Inventors: Hoon Choi, Hwaseong-si (KR); Jonghyeok Youn, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/273,889

(22) Filed: Sep. 23, 2016

(65) Prior Publication Data

US 2017/0118759 A1    Apr. 27, 2017

(30) Foreign Application Priority Data

Oct. 21, 2015 (KR) .................. 10-2015-0146804

(51) Int. Cl.
*H04W 72/04* (2009.01)
*H04W 72/08* (2009.01)

(52) U.S. Cl.
CPC ..... *H04W 72/0453* (2013.01); *H04W 72/082* (2013.01)

(58) Field of Classification Search
CPC .............. H04W 72/0453; H04W 72/082
See application file for complete search history.

(56) References Cited

U.S. PATENT DOCUMENTS

| 8,184,026 | B2 | 5/2012 | Kim et al. | |
|---|---|---|---|---|
| 2005/0186932 | A1* | 8/2005 | Kurimoto | H04B 1/1615 455/284 |
| 2006/0072350 | A1* | 4/2006 | Mitrosky | H02M 1/12 363/39 |
| 2006/0121861 | A1* | 6/2006 | Diepstraten | H04L 7/04 455/130 |
| 2008/0119140 | A1* | 5/2008 | Maligeorgos | H04B 1/40 455/67.13 |
| 2011/0034132 | A1* | 2/2011 | Babitch | H04B 15/02 455/76 |
| 2014/0218352 | A1 | 8/2014 | Zhao et al. | |
| 2014/0287795 | A1 | 9/2014 | Lee | |

(Continued)

FOREIGN PATENT DOCUMENTS

KR    1496672    2/2015

*Primary Examiner* — Christopher M Brandt
(74) *Attorney, Agent, or Firm* — Nixon & Vanderhye, P.C.

(57) ABSTRACT

Provided are an electronic device and method for avoiding interference between frequencies therefor. The electronic device may include: a housing; a wireless communication circuit arranged in the housing; at least one electronic component arranged in the housing; a processor electrically connected with the wireless communication circuit and the at least one electronic component; and a memory electrically connected with the processor. The memory may store instructions that, when executed, cause the processor to send or receive a signal to or from the at least one electronic component using a first frequency, to send or receive a signal to or from an external device through the wireless communication circuit using a second frequency, and to determine whether to change the first frequency in consideration of the second frequency. Other embodiments are possible.

20 Claims, 10 Drawing Sheets

(56) References Cited

U.S. PATENT DOCUMENTS

| | | | |
|---|---|---|---|
| 2015/0093994 A1* | 4/2015 | Skinner | H04W 52/241 455/63.1 |
| 2015/0208425 A1* | 7/2015 | Caretti | H04W 72/0426 370/336 |
| 2015/0222635 A1* | 8/2015 | Yang | H04B 1/3816 726/4 |
| 2017/0055107 A1* | 2/2017 | Zhu | H04W 4/008 |

* cited by examiner

ELECTRONIC DEVICE AND METHOD FOR AVOIDING INTERFERENCE BETWEEN FREQUENCIES THEREFOR

CROSS-REFERENCE TO RELATED APPLICATION

This application is based on and claims priority under 35 U.S.C. § 119 to Korean Patent Application No. 10-2015-0146804, filed on Oct. 21, 2015 in the Korean Intellectual Property Office, which is incorporated by reference herein in its entirety.

TECHNICAL FIELD

Various embodiments of the disclosure relate to an electronic device and method for avoiding interference between frequencies therefor.

BACKGROUND

An electronic device may refer to a device that can perform a specific function according to an installed program, such as a home appliance, electronic organizer, portable multimedia player, mobile communication terminal, tablet computer, video/audio player, desktop computer, laptop computer, or car navigation aid. With achievement of a high degree of integration of components and popularization of high-speed and large-capacity wireless communication, electronic devices tend to have a variety of functions.

Meanwhile, to provide various functions, electronic components may be mounted in one electronic device and these components may exchange information with each other on the basis of a specific frequency.

In an electronic device, the frequency (e.g. system frequency) used for communication between internal components tends to be multiplied. This multiplied system frequency may interfere with other frequencies. For example, the multiplied system frequency may cause interference with a radio frequency used for wireless communication with an external electronic device or for GPS communication, degrading performance of wireless communication.

SUMMARY

Aspects of the disclosure address at least the above mentioned problems and/or disadvantages and provide various example advantages described below. Accordingly, an aspect of the disclosure is to provide a method for managing the system frequency at least partially on the basis of an interference relationship between the system frequency and a specific radio frequency band, and an electronic device supporting the same.

In accordance with an example aspect of the disclosure, an electronic device is provided. The electronic device may include: a housing; a wireless communication circuit arranged in the housing; at least one electronic component arranged in the housing; a processor electrically connected with the wireless communication circuit and the at least one electronic component; and a memory electrically connected with the processor. The memory may store instructions that, when executed, cause the processor to send or receive a signal to or from the at least one electronic component using a first frequency, to send or receive a signal to or from an external device through the wireless communication circuit using a second frequency, and to determine whether to change the first frequency in consideration of the second frequency.

BRIEF DESCRIPTION OF THE DRAWINGS

The above and other aspects, features, and advantages of certain embodiments of the disclosure will be more apparent from the following detailed description, taken in conjunction with the accompanying drawings, in which like reference numerals refer to like elements, and wherein.

DETAILED DESCRIPTION

Figure 1:
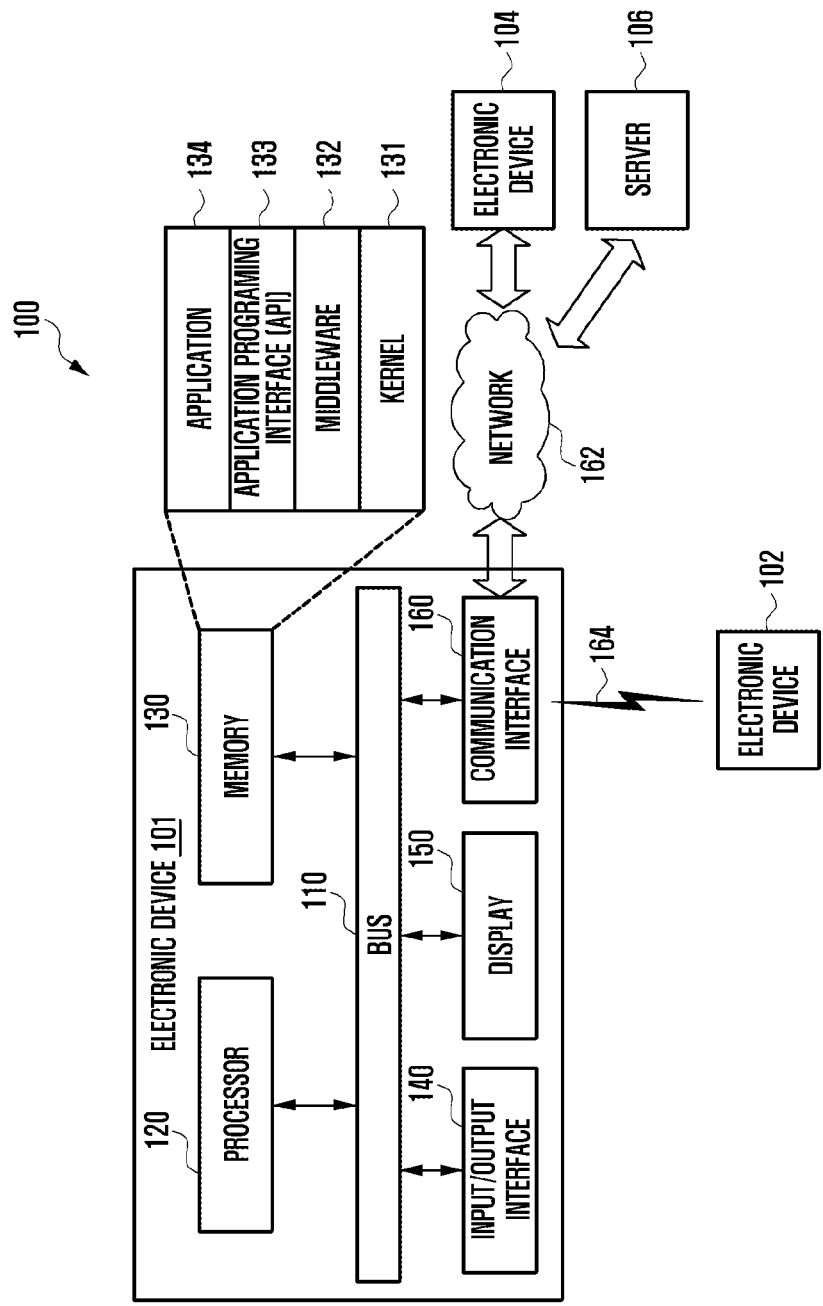
FIG. 1 is a diagram illustrating an example network environment including electronic devices according to various example embodiments of the disclosure.

The following description is made with reference to the accompanying drawings and is provided to assist in a comprehensive understanding of various example embodiments of the present disclosure. It includes various specific and example details to assist in that understanding, but these are to be regarded as merely examples. Accordingly, those of ordinary skill in the art will recognize that various changes and modifications of the various example embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements, and do not limit one or more additional functions, operations, and constituent elements. In the present disclosure, the terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices, although both are user devices. For further example, a first element could be termed a second element, and similarly, a second element could also be termed a first element without departing from the scope of the present disclosure.

In the case where a component is referred to as being "connected" or "accessed" to another component, it should be understood that not only is the component connected or accessed to the other component, but also another component may exist between the component and the other component. In the case where a component is referred to as being "directly connected" or "directly accessed" to another component, it should be understood that there is no component therebetween.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

The electronic device may correspond, for example, to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., Moving Picture Experts Group phase 1 or phase 2 (MPEG-1 or MPEG-2) audio layer 3 (MP3) player), a mobile medical device, a camera, or a wearable device. Examples of the wearable device include a head-mounted-device (HMD) (e.g., electronic eyeglasses), electronic clothing, an electronic bracelet, an electronic necklace, an appcessory, an electronic tattoo, a smart watch, and the like.

The electronic device according to various example embodiments of the present disclosure may also include smart home appliances. Examples of the smart home appliances include a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to various example embodiments of the present disclosure may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller's machine (ATM), a point of sales (POS) system, and the like.

The electronic device according to various example embodiments of the present disclosure may also include furniture or a portion of a building/structure, an electronic board, an electronic signature receiving device, a projector, various measuring instruments (e.g., a water meter, an electric meter, a gas meter and a wave meter) and the like. The electronic device according to various example embodiments of the present disclosure may also include a combination of the devices listed above. In addition, the electronic device according to various example embodiments of the present disclosure may be a flexible and/or contoured device. It should be apparent to those skilled in the art that the electronic device according to various example embodiments of the present disclosure is not limited to the aforementioned devices.

Hereinafter, electronic devices according to various example embodiments of the present disclosure will be described in greater detail with reference to the accompanying drawings. In the description, the term a 'user' may refer to a person or a device that uses or otherwise controls the electronic device, e.g., an artificial intelligent electronic device.

FIG. 1 is a diagram illustrating an example network environment including an electronic device according to an example embodiment of the present disclosure.

Referring to FIG. 1, an electronic device 101 of a network environment 100 may include a bus 110, a processor 120, a memory 130, an input/output (I/O) interface (e.g., including I/O circuitry) 140, a display 150 and a communication interface (e.g., including communication circuitry) 160.

The bus 110 may be a communication circuit that connects the components to each other and transfers data (e.g., control messages) between the components.

The processor 120 may receive instructions from the components (e.g., the memory 130, I/O interface 140, display 150 and communication interface 160) via the bus 110, decode the instructions and perform corresponding operations or data processing according to the decoded instructions.

The memory 130 may store instructions or data transferred from/created in the processor 120 or the other components (e.g., I/O interface 140, display 150 and communication interface 160). The memory 130 may include programming modules, e.g., a kernel 131, a middleware 132, an application programming interface (API) 133, and an application module 134. Each of the programming modules may be software, firmware, hardware or a combination thereof.

The kernel 131 may control or manage system resources (e.g., the bus 110, processor 120, and memory 130) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling and load balancing) for task requests transmitted from the application module 134 using, for example, a method for assigning the order of priority to use the system resources (e.g., the bus 110, processor 120, and memory 130) of the electronic device 101 to at least one of the applications of the application module 134.

The API 133 is an interface that allows the application module 134 to control functions of the kernel 131 or middleware 132. For example, the API 133 may include at least one interface or function (e.g., instruction) for file control, window control, character control, video process, and the like.

In various example embodiments of the present disclosure, the application module 134 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like). The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, and the like), to an external electronic device (e.g., electronic device 104). In addition, the notification relay application may receive notification information from an external electronic device (e.g., electronic device 104) and provide it to the user. The device management application can manage (e.g., install, delete, or update) part of the functions of an external electronic device (e.g., electronic device 104) communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In various example embodiments of the present disclosure, the application module 134 may also include applications designated according to attributes (e.g., type of electronic device) of the external electronic device (e.g., electronic device 104). For example, if the external electronic device is an MP3 player, the application module 134 may include an application related to music playback. If the external electronic device is a mobile medical device, the application module 134 may include an application related to health care. In an embodiment of the present disclosure, the application module 134 may include an application designated in the electronic device 101 and applications transmitted from external electronic devices (e.g., server 106, electronic device 104, and the like).

The I/O interface 140 may receive instructions or data from the user via an I/O system that may include various I/O circuitry (e.g., a sensor, keyboard or touch screen) and transfers them to the processor 120, memory 130 or communication interface 160 through the bus 110. For example, the I/O interface 140 may provide data corresponding to a user's touch input to a touch screen to the processor 120. The I/O interface 140 may receive instructions or data from the processor 120, memory 130 or communication interface 160 through the bus 110, and output them to an I/O system (e.g., a speaker or a display). For example, the I/O interface 140 may output voice data processed by the processor 120 to a speaker.

The display 150 may display information (e.g., multimedia data, text data, and the like) on a screen so that the user can view it.

The communication interface 160 may include various communication circuitry to communicate between the electronic device 101 and an external system (e.g., an electronic device 104 or server 106). For example, the communication interface 160 may connect to a network 162 in a wireless or wired mode, and communicate with the external system. Wireless communication may include various communication circuitry, such as, for example, and without limitation, Wi-Fi, Bluetooth (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short range communication 164. Wired communication may include universal serial bus (USB), high definition multimedia interface (HDMI), recommended standard 232 (RS-232), plain old telephone service (POTS), and the like.

In an example embodiment of the present disclosure, the network 162 may be a telecommunication network. The telecommunication network may include a computer network, Internet, Internet of things (IoT), telephone network, and the like. The protocol for communication between the electronic device 101 and the external system, e.g., transport layer protocol, data link layer protocol, or physical layer protocol, may be supported by at least one of the application module 134, API 133, middleware 132, kernel 131 and communication interface 160.

Figure 2:
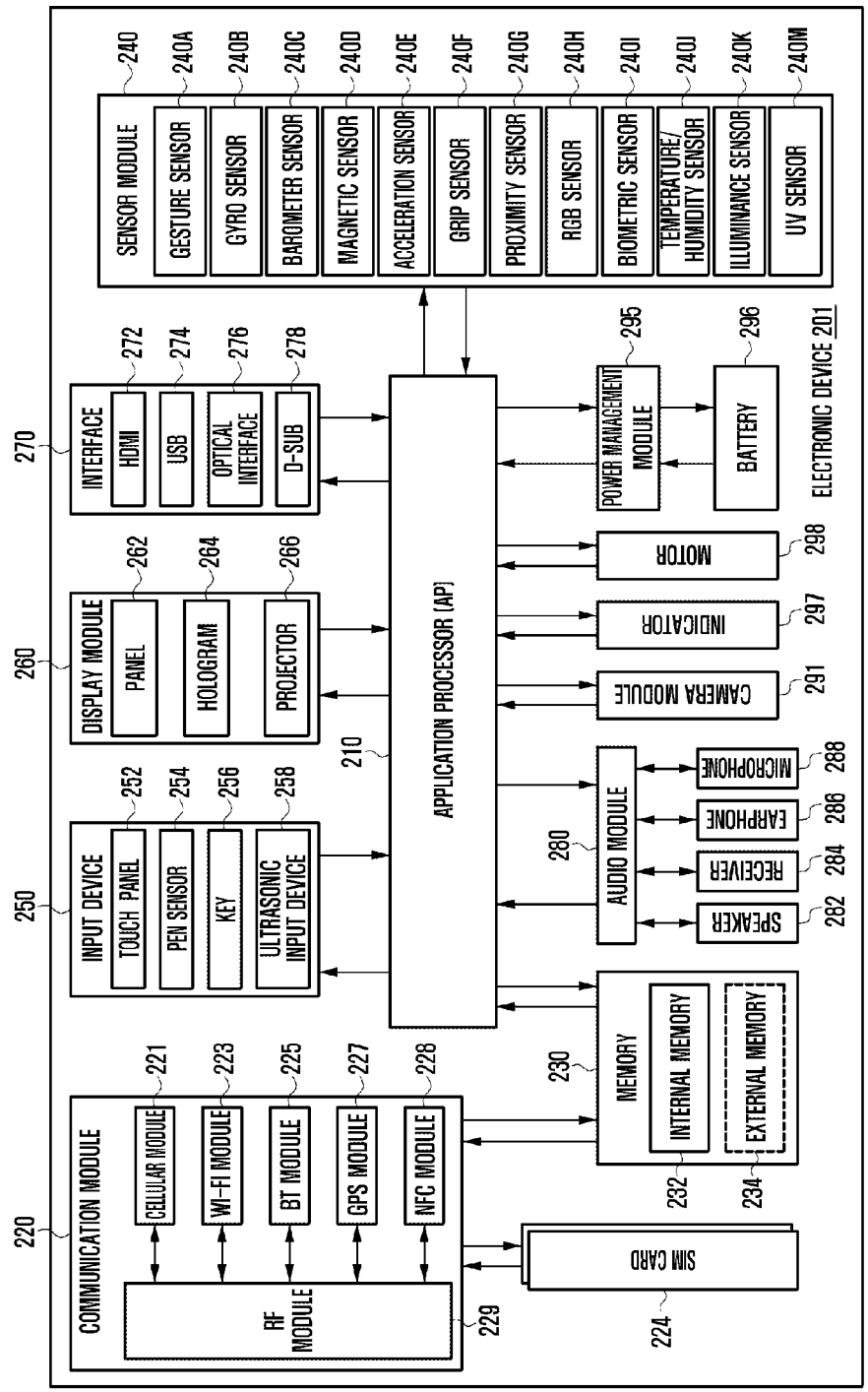
FIG. 2 is a block diagram illustrating an example electronic device according to various example embodiments of the disclosure.

FIG. 2 is a block diagram illustrating an example electronic device according to an example embodiment of the present disclosure.

Referring to FIG. 2, an electronic device 201 may be all or part of the electronic device 101 as illustrated in FIG. 1, and may include one or more processors of an application processor (AP) 210, a communication module (e.g., including communication circuitry) 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphics processing unit (GPU).

The communication module 220 (e.g., communication interface 160) performs communication for data transmission/reception between the other electronic devices (e.g., an electronic device 102 or 104, and server 106) that are connected to the electronic device (e.g., electronic device 101) via the network. In an example embodiment of the present disclosure, the communication module 220 may include various communication circuitry, such as, for example, and without limitation, a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using their SIM (e.g., SIM card 224). In an embodiment of the present disclosure, the cellular module 221 may perform part of the functions of the AP 210. For example, the cellular module 221 may perform part of the functions for controlling multimedia.

In an example embodiment of the present disclosure, the cellular module 221 may include a communication processor (CP). The cellular module 221 may be implemented with, for example, an SoC. Although the embodiment of the present disclosure illustrated in FIG. 2 is implemented in such a way that the cellular module 221 (e.g., CP), the power management module 295, the memory 230, and the like, are separated from the AP 210, an embodiment can be modified in such a way that the AP 210 includes at least part of the listed elements or other elements of the device 201 (e.g., cellular module 221).

In an example embodiment of the present disclosure, the AP 210 or the cellular module 221 (e.g., CP) may load instructions or data transmitted to and from at least one of a non-volatile memory or other components, on a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the present disclosure illustrated in FIG. 2 is implemented in such a way that the cellular module 221, Wi-Fi module 223, BT module 225, GPS module 227, and NFC module 228 are separated from each other, an embodiment can be modified in such a way that parts of the elements (e.g., two or more) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi 223, may be implemented with a SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the present disclosure illustrated in FIG. 2 is implemented in such a way that the cellular module 221, Wi-Fi module 223, BT module 225, GPS module 227, and NFC module 228 share the RF module 229, an embodiment can be modified in such a way that at least one of the elements transmit or receive RF signals via a separate RF module.

The SIM card 224 may be a card with a SIM. The SIM card 224 may be fitted into a slot of the electronic device. The SIM card 224 may include unique identification information, e.g., integrated circuit card identifier (ICCID), or subscriber information, e.g., international mobile subscriber identity (IMSI).

The memory 230 (e.g., memory 130) may include built-in or internal memory 232 and/or external memory 234. The internal memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

In an example embodiment of the present disclosure, the internal memory 232 may be a solid state drive (SSD). The external memory 234 may further include a flash drive, e.g., compact flash (CF), secure digital (SD), micro-SD, mini-SD, extreme digital (XD), a memory stick, and the like. The external memory 234 may be functionally connected to the electronic device via various types of interfaces. In an embodiment of the present disclosure, the electronic device 101 may further include storage devices or storage media such as hard drives.

The sensor module 240 may measure a physical quantity or sense operation states of the electronic device 201 and convert the measured or sensed data into electrical signals. The sensor module 240 may include at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (biometric sensor) 240I, a temperature/humidity sensor 240J, an illuminance sensor 240K, and an ultra-violet (UV) sensor 240M.

The sensor module 240 may also include an e-nose sensor, electromyography (EMG) sensor, an electroencephalogram (EEG) sensor, an electrocardiogram (ECG) sensor, an infrared (IR) sensor, a fingerprint sensor, an iris sensor, and the like. The sensor module 240 may further include a control circuit for controlling the one or more sensors.

The input device 250 may include a touch panel 252, a pen sensor 254 (i.e., a digital pen sensor), a key 256 and an ultrasonic input device 258. The touch panel 252 may sense touches using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel can also sense mechanical/physical touches or proximity of an object. The touch panel 252 may further include a tactile layer. In that case, the touch panel 252 can also provide tactile feedback to the user.

The pen sensor 254 (i.e., digital pen sensor) may be detected in a same or similar way as receiving a user's touch input or by using a separate recognition sheet. The key 256 may include mechanical buttons, optical keys or a key pad. The ultrasonic input device 258 is a device that can sense sounds via a microphone 288 of the electronic device 201 by using an input tool for generating ultrasonic signals, and then receiving and checking data associated with the signals. The ultrasonic input device 258 can sense signals in a wireless mode. In an embodiment of the present disclosure, the electronic device 201 may also receive a user's inputs from an external system (e.g., a computer or server) via the communication module 220.

The display module 260 (e.g., display 150) may include a panel 262, a hologram unit 264, or a projector 266. The panel 262 may be implemented with a liquid crystal display (LCD), active matrix organic light emitting diodes (AMOLEDs), or the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the present disclosure, the display module 260 may further include a control circuit for controlling the panel 262, the hologram unit 264, or the projector 266.

The interface 270 may include a HDMI 272, a USB 274, an optical interface 276, a D-subminiature (D-sub) 278, and the like. The interface 270 may also be included in the communication interface 160 illustrated in FIG. 1. The interface 270 may also include a mobile high-definition link (MHL) interface, an SD card, a multi-media card (MMC) interface, an infrared data association (IrDA) standard interface, or the like.

The audio module 280 may provide conversions between audio and electrical signals. At least part of the components in the audio module 280 may be included in the I/O interface 140 illustrated in FIG. 1. The audio module 280 may process audio output from/input to, for example, a speaker 282, a receiver 284, earphones 286, the microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplied to the electronic device 201. The power management module 295 may include a power management integrated circuit (PMIC), a charger IC, a battery or fuel gauge, and the like.

The PMIC may be implemented in the form of an IC chip or SoC. Charging electric power may be performed in wired and/or wireless modes. The charger IC may charge a battery, and prevent input over-voltage or input over-current to the battery from a charger. In an embodiment of the present disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual amount of the battery 296, a level of voltage, a level of current, a temperature during the charge, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. Although not shown, the electronic device 201 may include a processor for supporting a mobile TV, e.g., a GPU. The mobile TV supporting processor may process media data that complies with standards of digital multimedia broadcasting (DMB), digital video broadcasting (DVB), media flow, and the like.

Each of the elements/units of the electronic device according to the present disclosure may be implemented with one or more components, and may be called different names according to types of electronic devices. The electronic device according to the present disclosure may include at least one element described above. The electronic device may also be modified in such a way as to remove part of the elements or include new elements. In addition, the electronic device according to the present disclosure may also be modified in such a way that parts of the elements are integrated into one entity that performs their original functions.

In the present disclosure, the terminology 'module' refers to a 'unit' including hardware (e.g., circuitry), software, firmware or a combination thereof. For example, the terminology 'module' is interchangeable with 'unit,' 'logic,' 'logical block,' 'component,' 'circuit,' and the like. A 'module' may be the least identifiable unit or part of an integrated component. A 'module' may also be the least unit or part thereof that can perform one or more functions of the module. A 'module' may be implemented through mechanical or electronic modes. For example, 'modules' according to various example embodiments of the present disclosure may be implemented with at least one of a processor or processing circuitry (e.g., including a CPU), an application specific integrated circuit (ASIC) chip, a field-programmable gate array (FPGAs) and a programmable-logic device that can perform functions that are known or will be developed.

An electronic device according to various example embodiments of the present disclosure may also include a communication module including a BT module for communicating with external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various example embodiments of the present disclosure may also include a communication module for communicating with the external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various example embodiments of the present disclosure may also include a display module for displaying data received from an external device, a communication module for communicating with the electronic device or the external device, a sensor module for measuring a sensor value corresponding to a data request signal received from the electronic device, and an AP for selecting an external device to transmit data corresponding to a signal transmitted from the electronic device among the data received from the external device, wherein the AP receives the signal from the electronic device, transmits the data corresponding to the signal to the electronic device, receives an operation execution signal for the data from the electronic device, and performs at least one of various operations according to the operation execution signal.

Figure 3:
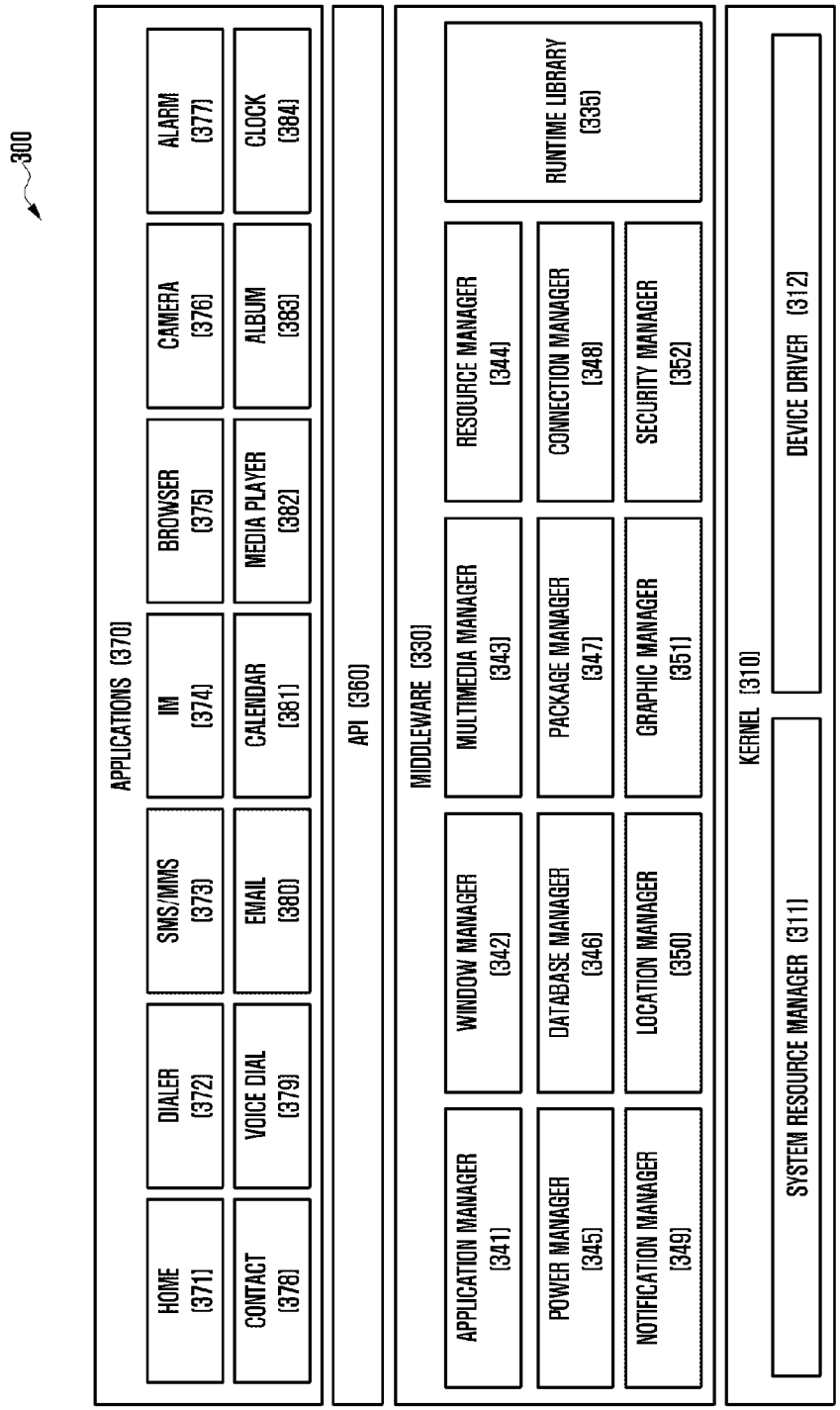
FIG. 3 is a block diagram illustrating an example program module according to various example embodiments of the disclosure.

FIG. 3 is a block diagram illustrating an example program module according to various example embodiments of the present disclosure.

Referring to FIG. 3, a program module 300 may include an OS for controlling resources related to the electronic device and/or various applications executed in the operating system. The OS may be, for example, Android, iOS, Windows, Symbian, Tizen, Bada, or the like, but is not limited thereto.

The program module 300 includes a kernel 310, middleware 330, an API 360, and/or applications 370. At least some of the program module 300 may be preloaded on an electronic device, or may be downloaded from an external electronic device (e.g., the electronic device 102 or 104, or the server 106).

The kernel 310 may include, for example, a system resource manager 311 and/or a device driver 312. The system resource manager 311 may perform control, allocation, retrieval, or the like, of system resources. According to an embodiment, the system resource manager 311 may include a process manager, memory manager, file system manager, or the like. The device driver 312 may include, for example, a display driver, camera driver, BT driver, shared memory driver, USB driver, keypad driver, Wi-Fi driver, audio driver, or inter-process communication (IPC) driver.

The middleware 330 may provide a function required by the applications 370 in common, or provide various functions to the applications 370 through the API 360 so that the applications 370 can efficiently use limited system resources within the electronic device. According to an embodiment of the present disclosure, the middleware 330 may include, for example, at least one of a runtime library 335, an application manager 341, a window manager 342, a multimedia manager 343, a resource manager 344, a power manager 345, a database manager 346, a package manager 347, a connectivity (connection) manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform I/O management, memory management, functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or BT. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements as required.

The API 360 is, for example, a set of API programming functions, and may be provided with a different configuration according to an OS. For example, in the case of Android or iOS, one API set may be provided for each platform. In the case of Tizen, two or more API sets may be provided for each platform.

The applications 370 may include, for example, one or more applications which can provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care (e.g., measure exercise quantity or blood sugar), or environment information (e.g., atmospheric pressure, humidity, or temperature information), not shown.

According to an example embodiment of the present disclosure, the applications 370 may include an application (hereinafter, referred to as an "information exchange application" for convenience of the description) supporting information exchange between the electronic device and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an example embodiment of the present disclosure, the applications 370 may include an application (e.g., a health care application of a mobile medical device or the like) designated according to an attribute of the external electronic device (e.g., the electronic device 102 or 104). According to an embodiment, the applications 370 may include an application received from the external electronic device (e.g., the server 106, or the electronic device 102 or 104). According to an embodiment of the present disclosure, the applications 370 may include a preloaded application or a third party application which can be downloaded from the server. Names of the elements of the program module 300, according to the above-described embodiments of the present disclosure, may change depending on the type of OS.

According to various embodiments of the disclosure, an electronic device may include a housing; a wireless communication circuit arranged in the housing; at least one electronic component arranged in the housing; a processor electrically connected with the wireless communication circuit and the at least one electronic component; and a memory electrically connected with the processor. The memory may store instructions that cause, when executed, the processor to send or receive a signal to or from the at least one electronic component using a first frequency, to send or receive a signal to or from an external device through the wireless communication circuit using a second frequency, and to determine whether to change the first frequency in consideration of the second frequency.

In one example embodiment, the instructions may cause the processor to determine whether the first frequency and the second frequency interfere with each other, to change, when the first frequency and the second frequency interfere with each other, the first frequency to a third frequency, and to maintain, when the first frequency and the second frequency do not interfere with each other, the first frequency.

In one example embodiment, the memory may store data associating the first frequency and the second frequency, and the instructions may cause the processor to determine whether to change the first frequency on the basis of the stored data.

In one example embodiment, the electronic device may further include an embedded SIM (eSIM) card electrically connected with the wireless communication circuit, and the instructions may cause the processor to determine the second frequency on the basis of the eSIM card and to determine whether to change the first frequency by comparing the first frequency with the second frequency.

According to various example embodiments of the disclosure, an electronic device may include a housing; a wireless communication circuit arranged in the housing; at least one electronic component arranged in the housing; a processor electrically connected with the wireless communication circuit and the at least one electronic component; and a memory electrically connected with the processor. The memory may store instructions that cause, when executed, the processor to communicate with the at least one electronic component using a first frequency, to identify a second frequency upon detection of an interrupt, to determine whether the first frequency and the second frequency interfere with each other, and to change, when the first frequency and the second frequency interfere with each other, the first frequency to a third frequency.

In one example embodiment, the second frequency may be used to send or receive a signal to or from an external device.

In one example embodiment, the instructions may cause the processor to identify the second frequency on the basis of information received from a base station.

In one example embodiment, the interrupt may correspond to booting, handover, SIM card insertion, roaming, opening, configuration change, GNSS activation, or WLAN activation in the electronic device.

In one example embodiment, the memory may store data indicating a relationship of interference between the first frequency and the second frequency.

In one example embodiment, the instructions may cause the processor to determine that the first frequency and the second frequency interfere with each other when the absolute value of the signal sensitivity at the second frequency is less than or equal to a first threshold.

In one example embodiment, the instructions may cause the processor to determine that the first frequency and the second frequency interfere with each other, and to change the first frequency to the third frequency when the electronic device is in sleep mode or a specific application terminates execution on the electronic device.

In one example embodiment, the instructions may cause the processor to determine whether the electronic device is placed in a strong electric field area, and to maintain, upon determining that the electronic device is placed in a strong electric field area, the first frequency although the first frequency and the second frequency interfere with each other.

In one example embodiment, the instructions may cause the processor to determine that the electronic device is placed in a strong electric field area when the absolute value of the signal sensitivity at the second frequency is greater than or equal to a second threshold.

According to various example embodiments of the disclosure, a computer readable storage medium may store a program that implements a method for avoiding interference between frequencies in an electronic device. The program may be configured to perform communication among electronic components using a first frequency, identify a second frequency upon detection of an interrupt, determine whether the first frequency and the second frequency interfere with each other, and change, upon determining that the first frequency and the second frequency interfere with each other, the first frequency to a third frequency.

Figure 4:
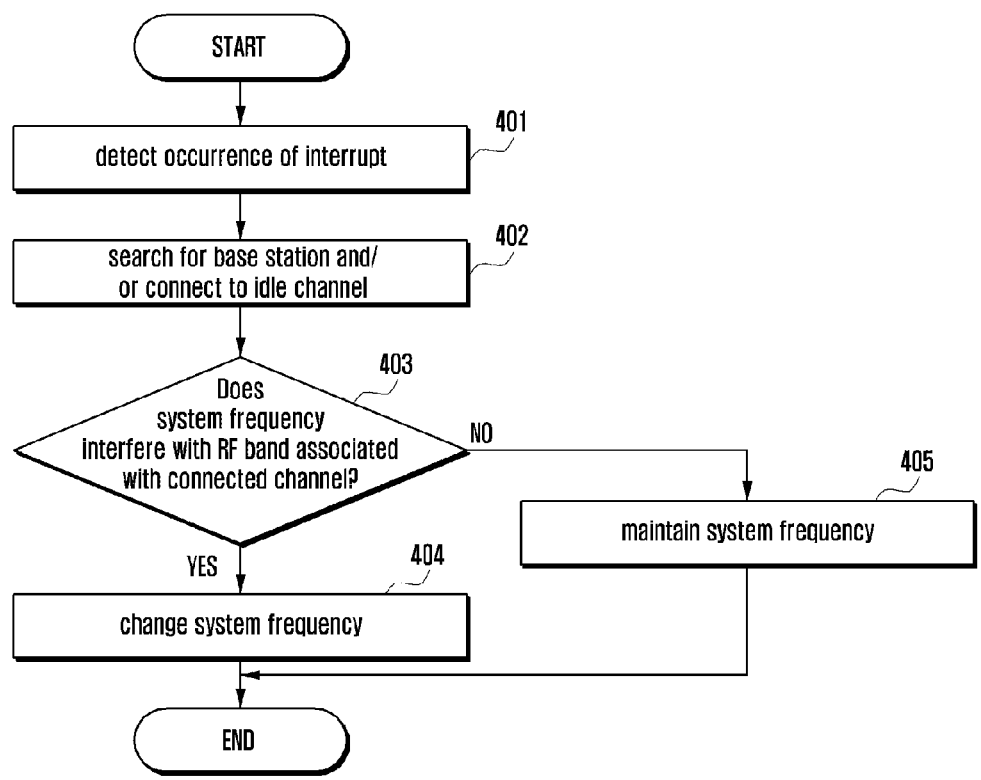
FIG. 4 is a flowchart illustrating example operations of the electronic device according to various example embodiments of the disclosure.
Figure 7:
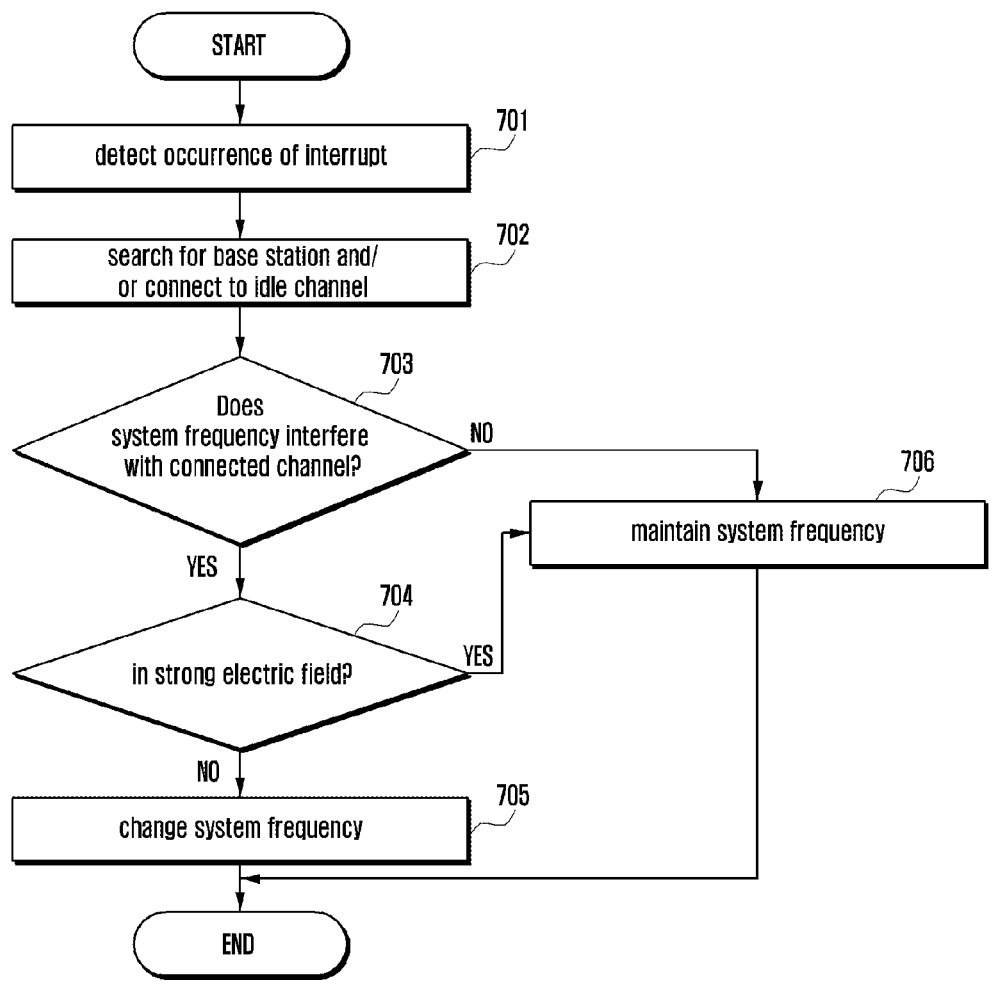
FIG. 7 is a flowchart illustrating example operations of the electronic device according to various example embodiments of the disclosure.

A more detailed description of a method for avoiding interference between frequencies in the electronic device is provided with reference to FIGS. 4 and 7.

In various example embodiments, the electronic device may determine whether the system frequency interferes with a wireless communication frequency on the basis of data stored in the memory (e.g. memory 130 in FIG. 1).

The memory of the electronic device may store data describing a relationship of interference between the system frequency and a radio frequency band associated with a channel to which the electronic device may connect. For example, this data may be a table stored in the memory. That is, the electronic device may determine whether the system frequency interferes with a radio frequency band associated with a channel to which the electronic device connects at least partially on the basis of such a data table.

By way of illustration, Table 1 describes an interference relationship between the Mobile Industry Processor Interface (MIPI) frequency serving as the system frequency and frequency bands assigned to different wireless communication technologies. The MIPI specifications standardize hardware and software interfaces between processors and peripheral components of electronic devices. For example, there are D-PHY serial interface specifications for cameras and displays and M-PHY serial interface specifications for RF-ICs. The MIPI frequency may refer to a frequency used for such interfaces.

The frequencies used for wireless communication may cover, for example, Long Term Evolution (LTE), LTE Advanced (LTE-A), Code Division Multiple Access (CDMA), wideband CDMA (WCDMA), Universal Mobile Telecommunications System (UMTS), Wireless Broadband (WiBro), and Global System for Mobile Communications (GSM). Wireless communication may also cover local area communication or short-range communication, such as Wi-Fi, Bluetooth, Near Field Communication (NFC), or Magnetic Secure Transmission (MST). Wireless communication may cover the Global Navigation Satellite System (GNSS).

In Table 1, B's such as B2 and B3 indicate a band of frequencies with a given width and center frequency. That is, a frequency band may include a range of frequencies around the center frequency.

For example, although differing by mobile operator, LTE (4G) frequencies may include B1, B3, B5 and B8. In particular, Band 8 (B8) indicates the 900 MHz band with a width of 35 MHz where the uplink frequency is 880-915 MHz and the downlink frequency is 925-960 MHz.

LTE-A frequencies may be composed of two separate LTE bands. For example, a frequency band with a 10 MHz width may be combined with another frequency band with a 10 MHz width to produce a frequency band with a 20 MHz width. CDMA frequencies may include a band of 1750-1780 MHz and a band of 1840-1870 MHz. WCDMA frequencies may include a 2.1 GHz band. UMTS frequencies may include a band of 1920-2170 MHz.

GSM frequencies may be composed of different bands. For example, GSM850 band corresponds to a band of 824-894 MHz, and GSM900 band corresponds to a band of 880-960 MHz. WiBro frequencies may include a band of 2300-2400 MHz.

Wi-Fi frequencies may be composed of a 2.4 GHz band and a 5 GHz band. Bluetooth frequencies may include a band of 2400-2483.5 MHz. NFC frequencies may include a 13.56 MHz band. GPS frequencies may include a 1575.42 MHz band or a 1227.60 MHz band.

Table 1 shows only a partial list of frequencies used in wireless communication, and the disclosure is not limited thereto or thereby.

TABLE 1

| Category | 4G | 3G | 2G | GNSS | WLAN |
|---|---|---|---|---|---|
| 450 MHz | | | | GPS | |
| 456 MHz | B3 | B2 | DCS | Glonass | |
| 462 MHz | B3, B8, B40 | B2, B8 | EGSM, DCS | | |
| 468 MHz | B3, B8, B40 | B2, B8 | EGSM, DCS | | 802.11ac |
| 474 MHz | B8, B40 | B8 | EGSM | | 802.11ac |
| 480 MHz | B8, B40 | B8 | EGSM | | 802.11ac |
| 486 MHz | B2, B25 | B2 | PCS | | 802.11ac |
| 492 MHz | B2, B25 | B2 | PCS | | 802.11ac |

TABLE 1-continued

| Category | 4G | 3G | 2G | GNSS | WLAN |
|---|---|---|---|---|---|
| 498 MHz | B25 | | | | 802.11ac |
| 504 MHz | B41 | | | | 802.11ac |

FIG. 4 is a flowchart illustrating example operations of the electronic device according to various embodiments of the disclosure.

In the electronic device, the processor may communicate with peripheral components on the basis of the system frequency. The MIPI frequency may be an instance of the system frequency. The interference between the system frequency of the electronic device and a frequency used for wireless communication may be caused when at least a portion of harmonics of the system frequency (i.e. frequency components at integer multiples of the system frequency) overlaps or becomes close to the wireless communication frequency.

At operation 401, the electronic device detects occurrence of an interrupt. Here, the interrupt may correspond to booting or rebooting of the electronic device, handover to another radio frequency band, recognition of SIM card insertion, eSIM card replacement, rebooting due to roaming, opening, configuration change, GNSS activation, or WLAN activation. A specific interrupt is described in connection with a relevant embodiment. The electronic device of the disclosure may include some or all of the components of the electronic device 101 illustrated in FIG. 1.

At operation 402, the electronic device searches for a base station and/or connects to an idle channel. For example, upon detection of an interrupt, the electronic device may search for a base station. The electronic device may receive information on an idle channel from the base station and connect to the idle channel on the basis of the received information. Searching for a base station may include sending a signal to the base station for communication, and may further include resending a signal to the base station for rediscovery in response to an interrupt of a given type. For example, in response to an interrupt due to service opening, the electronic device may attempt to newly discover a base station as there is no base station to which the electronic device has connected. In response to an interrupt due to GNSS activation, the electronic device may attempt to rediscover a base station as there is at least one base station to which the electronic device has connected.

At operation 403, the electronic device determines whether the system frequency interferes with a radio frequency band associated with the connected channel on the basis of data stored in the memory. For example, the data stored in the memory may be data describing an interference relationship between the system frequency and radio frequency bands as illustrated in Table 1. The processor of the electronic device may correspond to the processor 120 of the electronic device 101 illustrated in FIG. 1, and the memory thereof may correspond to the memory 130 in FIG. 1.

Upon determining that the system frequency interferes with a radio frequency band associated with the connected channel, at operation 404, the electronic device changes the system frequency to another frequency not interfering with the radio frequency band associated with the connected channel. Thereafter, the electronic device may operate at the changed system frequency.

Upon determining that the system frequency does not interfere with a radio frequency band associated with the connected channel, at operation 405, the electronic device maintains the current system frequency.

For example, the electronic device may operate at an MIPI frequency of 480 MHz and the frequency band associated with the channel to which the electronic device connects may be 3G B2 (Band 2). In this case, the electronic device may be rebooted. The electronic device may be rebooted owing to configuration change or by the user. Then, the electronic device may search for a base station, receive information on an idle channel from the found base station, and connect to the idle channel on the basis of the received information. The electronic device may find the radio frequency band associated with the connected channel to be 3G B8 (Band 8).

When the electronic device determines that the MIPI frequency interferes with the 3G B8 band on the basis of the data stored in the memory, it may change the MIPI frequency. For example, the electronic device may change the current MIPI frequency to another MIPI frequency not interfering with 3G B8 band frequencies (e.g. one of 450 MHz, 456 MHz, 486 MHz, 492 MHz, 498 MHz, and 504 MHz). The processor may operate at a new MIPI frequency of 456 MHz.

As another example, the processor of the electronic device may detect GNSS (Glonass) activation. GNSS activation may occur when an application requiring position information (e.g. navigation or map application) is executed. In this case, the electronic device operating at an MIPI frequency of 456 MHz may newly search for a base station, receive information on an idle channel from the found base station, and connect to the idle channel on the basis of the received information. When the radio frequency band associated with the connected channel is 3G B2, the processor may determine whether the MIPI frequency of 456 MHz interferes with Glonass frequencies or 3G B2 frequencies on the basis of the data stored in the memory. Here, the processor may change the MIPI frequency of 456 MHz to a new MIPI frequency of 498 MHz not interfering with Glonass frequencies or 3G B2 frequencies, and operate at the MIPI frequency of 498 MHz.

As another example, upon detection of an interrupt caused by SIM replacement, the electronic device may search for a base station, receive information on an idle channel from the found base station, and connect to the idle channel on the basis of the received information. When the radio frequency band associated with the connected channel is 4G B3, the processor may determine that the MIPI frequency of 498 MHz does not interfere with 4G B3 frequencies on the basis of the data stored in the memory. In this case, the electronic device may maintain the MIPI frequency of 498 MHz. SIM replacement may be initiated by the user in the case of network operator change.

As another example, upon detection of an interrupt caused by eSIM replacement, the electronic device may search for a base station, receive information on an idle channel from the found base station, and connect to the idle channel on the basis of the received information. When the radio frequency band associated with the connected channel is 4G B3, the processor may determine that the MIPI frequency of 498 MHz does not interfere with 4G B3 frequencies on the basis of the data stored in the memory. In this case, the electronic device may maintain the MIPI frequency of 498 MHz. Here, eSIM replacement may be initiated when a profile of one network operator is replaced with a profile of another network operator among profiles of network operators stored in advance or received from the outside in response to a separate request.

In one example embodiment, although the system frequency interferes with the frequency associated with the connected channel, the electronic device may postpone system frequency change until it enters sleep mode and change the system frequency in sleep mode. The electronic device may enter sleep mode, for example, when the display operation ends or when the electronic device is in a low-power state.

For example, when the user of the electronic device operating at an MIPI frequency of 480 MHz moves while wireless communication is in progress using the 4G B2 band, the location of the electronic device may change and the radio frequency band may change accordingly. That is, there may occur handover to another radio frequency band. Upon detection of handover, the electronic device may search for a base station, receive information on an idle channel from the found base station, and connect to the idle channel on the basis of the received information. The electronic device may find the radio frequency band associated with the newly connected channel to be 4G B8 on the basis of information received from the new base station. In this case, although determining that the MIPI frequency of 480 MHz interferes with the 4G B8 band, the electronic device may postpone MIPI frequency change until it enters sleep mode. Thereafter, upon entering sleep mode, the electronic device may change the MIPI frequency to 492 MHz (one of MIPI frequencies not interfering with 4G B8 band frequencies).

In one example embodiment, although the system frequency interferes with the frequency associated with the connected channel, when a specific application is running, the electronic device may postpone system frequency change until the application terminates and change the system frequency upon application termination. Here, the specific application may be an application that is configured by the user not to change the second frequency during execution. The specific application may also be an application that executes for a given time or more, an application that displays on the screen for a given time or more, or an application that executes in a particular orientation (e.g. landscape mode).

For example, the user may execute a navigation application on the electronic device. Execution of the navigation application may cause GNSS activation automatically or according to user settings. The user carrying the electronic device may move while manipulating the navigation application. As the location of the electronic device is changed, the radio frequency band may change accordingly. That is, there may occur handover to another radio frequency band. After handover, the electronic device may receive information on an idle channel from the target base station and connect to the idle channel on the basis of the received information. The electronic device may find the radio frequency band associated with the newly connected channel to be 4G B2 on the basis of the information received from the new base station. The electronic device may determine that the current MIPI frequency of 492 MHz interferes with the 4G B2 band. In this case, the electronic device may not change the MIPI frequency until the navigation application terminates. Thereafter, when the navigation application terminates, the electronic device may change the MIPI frequency to 498 MHz (one of MIPI frequencies not interfering with 4G B2 band frequencies).

Figure 5:
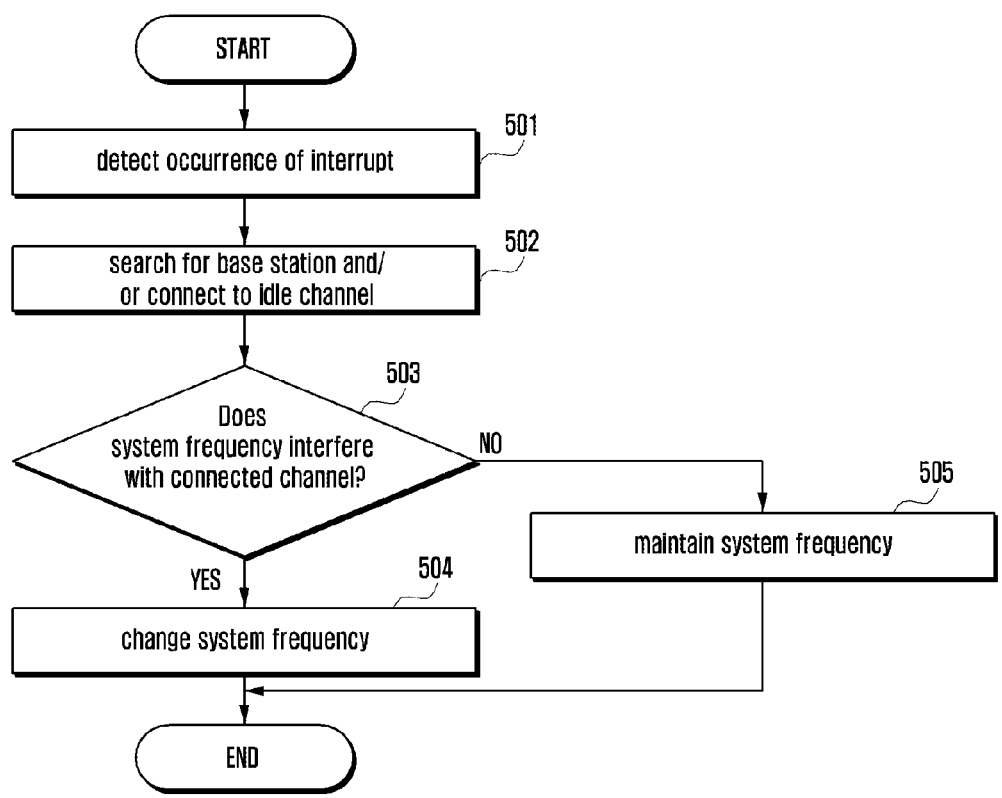
FIG. 5 is a flowchart illustrating example operations of the electronic device according to various example embodiments of the disclosure.
Figure 6A:
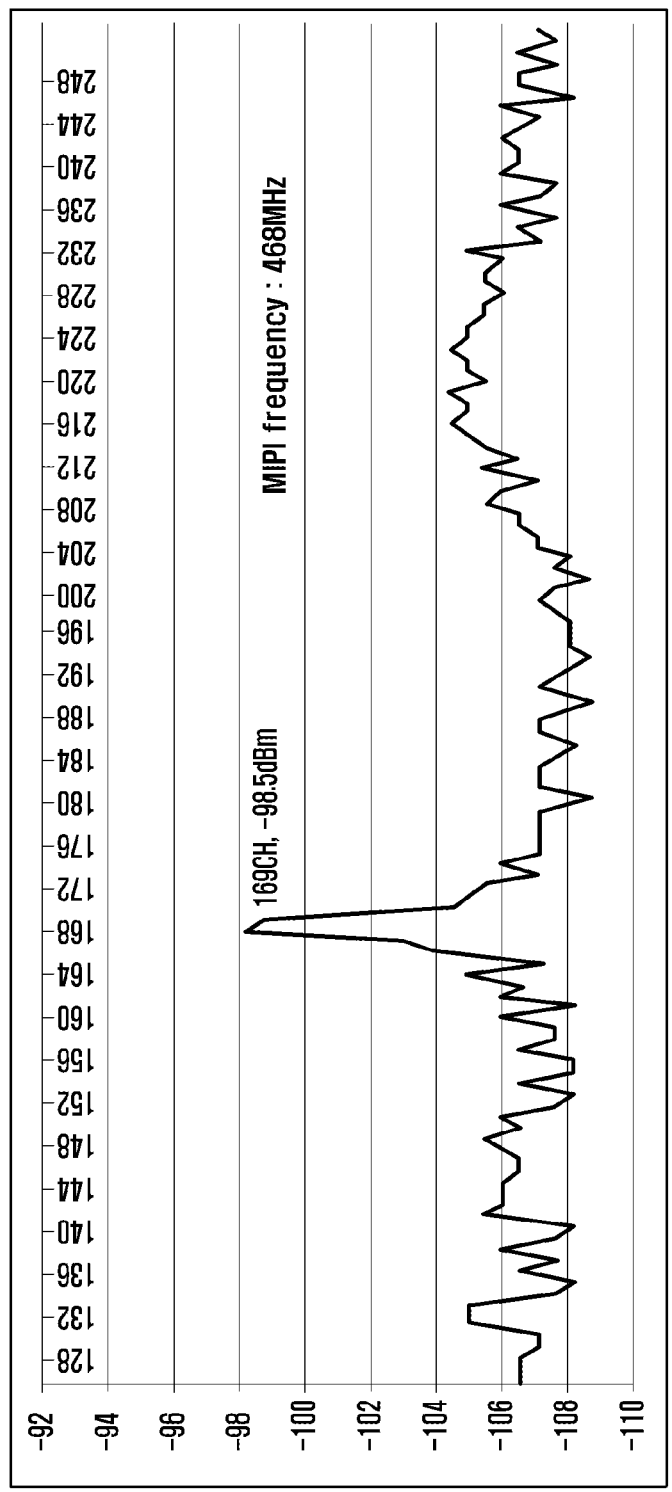
FIGS. 6A and 6B are graphs illustrating example results of operations of the electronic device according to various example embodiments of the disclosure.
Figure 6B:
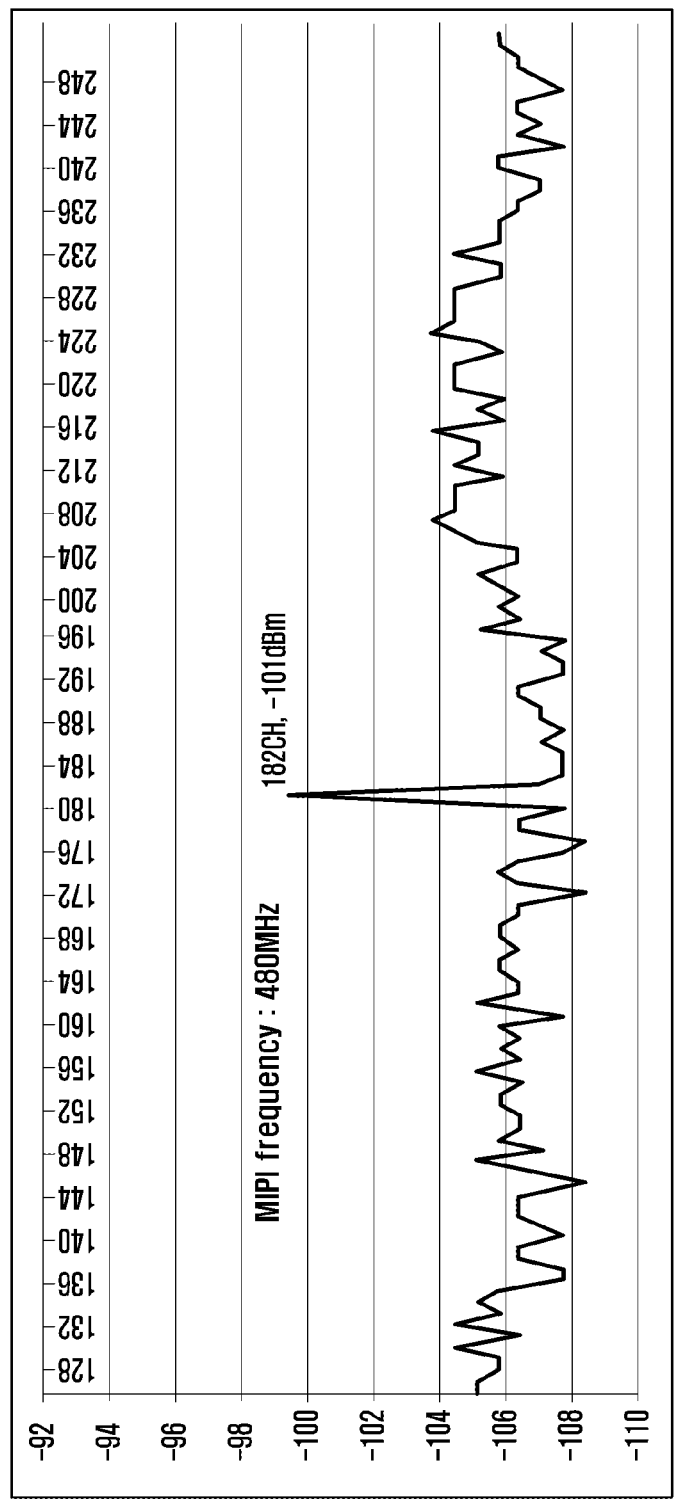

FIG. 5 is a flowchart illustrating example operations of the electronic device. FIGS. 6A and 6B are graphs illustrating example results of operations of the electronic device according to various example embodiments of the disclosure.

At operation 501, the electronic device detects occurrence of an interrupt. For example, there may occur handover to another radio frequency band.

In the case of an interrupt caused by handover, the electronic device is handed over from the source base station to the target base station. This corresponds to discovery of a new base station. Hence, the electronic device does not have to perform a separate search.

At operation 502, the electronic device searches for a base station and/or connects to an idle channel. For example, the electronic device may receive information on an idle channel from the target base station and connect to the idle channel on the basis of the received information. The electronic device may identify the connected channel and the frequency or radio frequency band associated with the channel on the basis of the received information. For example, the electronic device may find the connected channel to be "channel 169" associated with the 4G B8 band on the basis of the information received from the base station.

At operation 503, the electronic device determines whether the system frequency interferes with the frequency associated with the connected channel. The electronic device may determine whether the system frequency interferes with the frequency associated with the connected channel by checking whether the signal sensitivity on the channel is less than or equal to a preset threshold. The threshold may be set differently by the radio frequency band associated with a channel to which the electronic device connects. For example, when connected to "channel 169" associated with the 4G B8 band, the processor of the electronic device may check whether the signal sensitivity on "channel 169" is less than or equal to a preset threshold.

Upon determining that the system frequency interferes with the frequency associated with the connected channel, at operation 504, the electronic device changes the system frequency. For example, if the signal sensitivity on "channel 169" is less than or equal to the preset threshold, the processor of the electronic device may change the system frequency. Specifically, the electronic device may change the current MIPI frequency to another MIPI frequency not interfering with "channel 169" associated with 4G B8 band frequencies.

Upon determining that the system frequency does not interfere with the frequency associated with the connected channel, at operation 505, the electronic device maintains the current system frequency. For example, if the system frequency does not interfere with the frequency associated with "channel 169" (the signal sensitivity on "channel 169" is greater than the preset threshold), the processor of the electronic device may maintain the system frequency.

In various example embodiments, the absolute value of the threshold for the receive sensitivity may be set, for example, to 104 (dBm). Referring to FIG. 6A, the electronic device may be aware that the connected channel is "channel 169", "channel 169" is associated with the 4G B8 band and the receive sensitivity at "channel 169" is −98.5 dBm on the basis of the received information. Here, the absolute value of the receive sensitivity is less than 104 (threshold). This may indicate that the current MIPI frequency of 468 MHz interferes with wireless communication at "channel 169". In this case of interference, it is possible to change the MIPI frequency to, for example, 480 MHz as illustrated in FIG. 6B. After changing the MIPI frequency to 480 MHz, it can be seen that the MIPI frequency of 480 MHz interferes with wireless communication at "channel 182" associated with the 4G B8 band. Thereby, the electronic device may perform wireless communication through "channel 169" without interference caused by the MIPI frequency.

FIG. 7 is a flowchart illustrating example operations of the electronic device.

At operation 701, the electronic device detects occurrence of an interrupt.

At operation 702, the electronic device searches for a base station and/or connects to an idle channel. For example, upon detection of an interrupt, the electronic device may search for a base station. The electronic device may receive information on an idle channel from the base station and connect to the idle channel on the basis of the received information.

At operation 703, the electronic device determines whether the system frequency interferes with the frequency associated with the connected channel.

Upon determining that the system frequency does not interfere with the frequency associated with the connected channel, at operation 706, the electronic device maintains the current system frequency.

For example, eSIM replacement may occur when the electronic device operates at the system frequency of 480 MHz (MIPI frequency) and uses the 4G B2 band for wireless communication. Upon detection of eSIM replacement, the electronic device may receive information on an idle channel from the new base station after eSIM replacement and connect to the idle channel (e.g. "channel 228") on the basis of the received information. The electronic device may also be aware that "channel 228" is associated with a radio frequency band 4G B8. In this case, if the absolute value of the signal sensitivity at "channel 228" is greater than a first threshold of 105 (dBm), the electronic device may determine that the MIPI frequency of 480 MHz does not interfere with the connected channel "channel 228" and maintain the current MIPI frequency.

Upon determining that the system frequency interferes with the frequency associated with the connected channel, at operation 704, the electronic device determines whether it is placed in a strong electric field area. Here, the strong electric field area may refer to an area in which the signal sensitivity for wireless communication is greater than or equal to a preset threshold.

For example, in response to eSIM replacement, the electronic device may connect to an idle channel "channel 190" as directed by the new base station after eSIM replacement. Here, eSIM replacement may involve switching between profiles of different network operators.

When the signal sensitivity is −102 dBm at "channel 190", the absolute value thereof is less than the first threshold of 105. In this case, the electronic device may determine that the MIPI frequency of 480 MHz (system frequency) interferes with the frequency associated with the connected channel "channel 190", and then may check whether it is placed in a strong electric field area.

In one example embodiment, the electronic device may check whether it is placed in a strong electric field area on the basis of a second threshold set for strong electric field test. That is, when the absolute value of the signal sensitivity at the connected channel is greater than the second threshold, the electronic device may determine that it is placed in a strong electric field area.

For example, assume that the second threshold is set to 100 (dBm). In this case, as the signal sensitivity at the connected channel "channel 190" is −102 dBm, the absolute value thereof is greater than the second threshold. Hence, the electronic device may determine that it is placed in a strong electric field area.

Upon determine that it is placed in a strong electric field area, at operation 706, the electronic device maintains the current system frequency. In other words, although the system frequency (MIPI frequency) interferes with the frequency associated with the connected channel, when the electronic device is placed in a strong electric field area, the electronic device may maintain the current system frequency.

Upon determine that it is not placed in a strong electric field area, at operation 705, the electronic device changes the current system frequency.

For example, assume that the second threshold is set to 103 (dBm). In this case, as the signal sensitivity at the connected channel "channel 190" is −102 dBm, the absolute value thereof is less than the second threshold. Hence, the electronic device may determine that it is not placed in a strong electric field area. Thereafter, the electronic device may change the current MIPI frequency serving as the system frequency.

Figure 8:
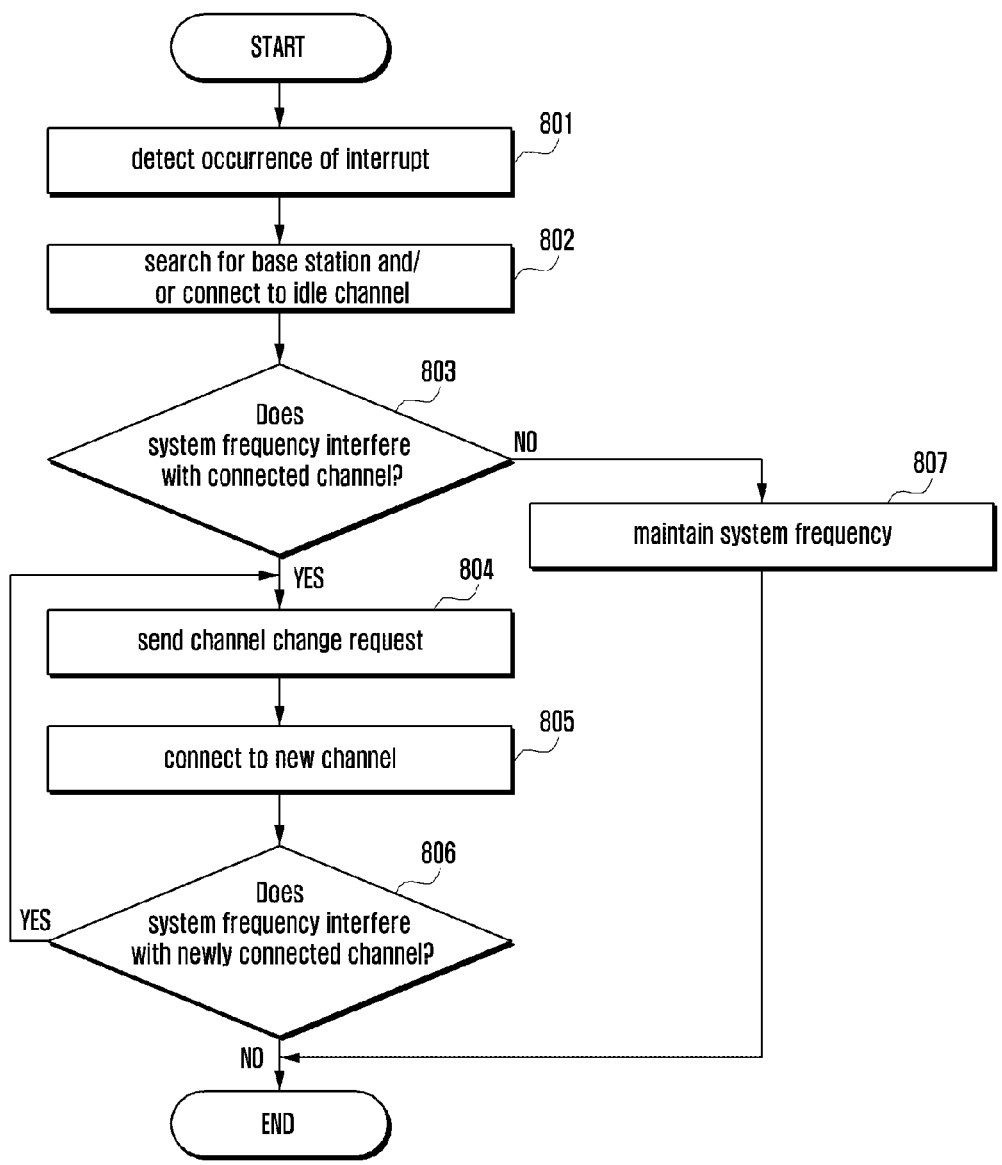
FIG. 8 is a flowchart illustrating example operations of the electronic device according to various example embodiments of the disclosure.

FIG. 8 is a flowchart illustrating example operations of the electronic device.

In one example embodiment, upon detection of an interrupt, the electronic device may search for a base station, receive information on an idle channel from the base station, and connect to the idle channel on the basis of the received information. When the signal sensitivity at the connected channel is less than or equal to a preset threshold, the electronic device may send a channel change request to the base station. The electronic device may receive information on an available channel from the base station and identify the channel to connect on the basis of the received information.

At operation 801, the electronic device detects occurrence of an interrupt. For example, configuration settings may be changed by the user. At operation 802, the electronic device searches for a base station and/or connects to an idle channel. For example, upon detection of an interrupt, the electronic device may search for a base station, receive information on an idle channel from the base station, and connect to the idle channel on the basis of the received information. The electronic device may identify the connected channel and the radio frequency band associated with the channel. Here, change of configuration settings may correspond to activation of cellular data utilization, or activation of tethering.

For example, in response to activation of cellular data utilization, the electronic device may search for a base station, receive information on an idle channel from the base station, and connect to the idle channel on the basis of the received information. The electronic device may be aware that the connected channel is "channel 169" associated with the 4G B8 band on the basis of the received information.

At operation 803, the electronic device determines whether the MIPI frequency serving as the system frequency interferes with the connected channel. In other words, the electronic device may check whether the signal sensitivity at "channel 169" is less than or equal to a preset threshold.

Upon determining that the MIPI frequency serving as the system frequency interferes with the connected channel, at operation 804, the electronic device sends a channel change request to the base station. For example, if the signal sensitivity at "channel 169" is less than or equal to the preset threshold, the processor of the electronic device may send a channel change request to the base station.

Upon determining that the MIPI frequency serving as the system frequency does not interfere with the connected channel, at operation 807, the electronic device maintains the current system frequency. For example, if the signal sensitivity at "channel 169" is greater than the preset threshold, the processor of the electronic device may maintain the current MIPI frequency.

Upon reception of the channel change request, the base station may send information on another channel to the electronic device. At operation 805, the electronic device connects to a different channel as directed by the base station. For example, the electronic device may newly connect to "channel 202" on the basis of the received information.

At operation 806, the electronic device determines whether the system frequency interferes with the newly connected channel. For example, if the signal sensitivity at "channel 202" is greater than the preset threshold, the processor of the electronic device may determine that the system frequency does not interfere with the new channel "channel 202" and may perform wireless communication through the new channel. Upon determining that the system frequency interferes with the newly connected channel, the procedure returns to operation 804 at which the electronic device may make a channel change request.

Figure 9:
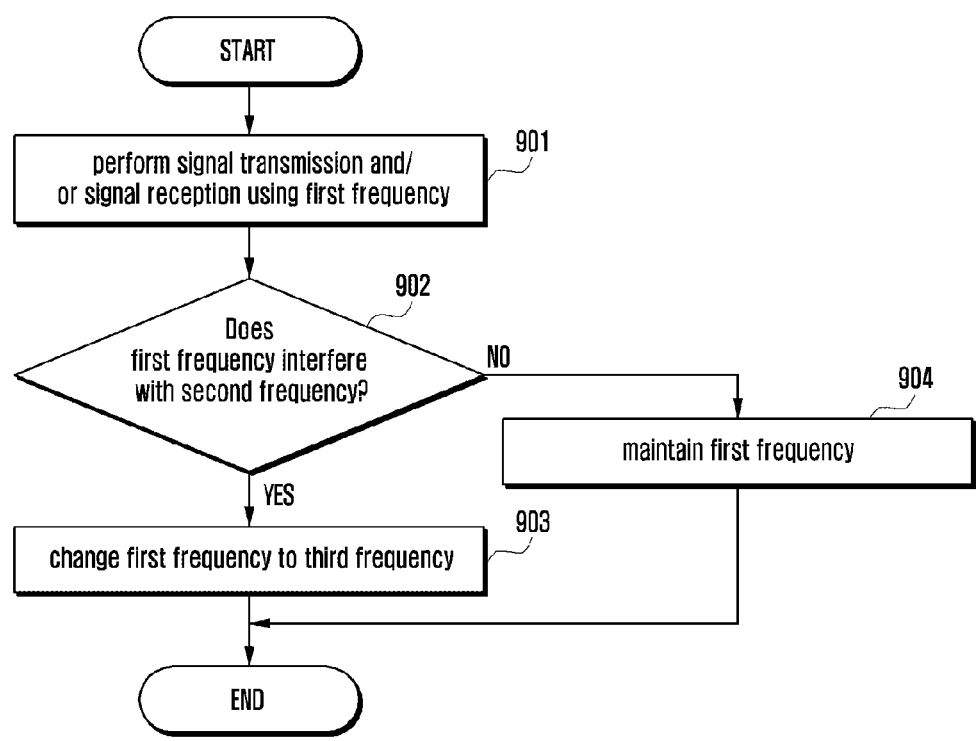
FIG. 9 is a flowchart illustrating example operations of the electronic device according to various example embodiments of the disclosure.

FIG. 9 is a flowchart illustrating example operations of the electronic device.

At operation 901, the electronic device perform signal transmission and/or signal reception using a first frequency. For example, the processor may communicate with one or more components using the first frequency. In one embodiment, the first frequency may be the system frequency such as one of MIPI frequencies.

At operation 902, the electronic device determines whether the first frequency interferes with a second frequency. In one embodiment, the second frequency may be one of frequencies usable for wireless communication.

Upon determining that the first frequency interferes with the second frequency, at operation 903, the electronic device changes the first frequency to a third frequency. In one example embodiment, the third frequency may be one of MIPI frequencies that are different from the first frequency and do not interfere with the second frequency.

Upon determining that the first frequency does not interfere with the second frequency, at operation 904, the electronic device maintains the first frequency.

According to various example embodiments of the disclosure, a method for avoiding interference in an electronic device may include: performing communication between electronic components by use of a first frequency; identifying a second frequency in response to detection of an interrupt; determining whether the first frequency interferes with the second frequency; and changing, upon determining that the first frequency interferes with the second frequency, the first frequency to a third frequency.

In one example embodiment, determining whether the first frequency interferes with the second frequency may include examining data describing an interference relationship between the first frequency and the second frequency.

In one example embodiment, determining whether the first frequency interferes with the second frequency may include determining that the first frequency interferes with the second frequency when the absolute value of the signal sensitivity associated with the second frequency is less than or equal to a first threshold.

In one example embodiment, changing the first frequency may include determining that the first frequency interferes with the second frequency, and changing the first frequency to the third frequency when the electronic device enters sleep mode.

In one example embodiment, changing the first frequency may include determining that the first frequency interferes with the second frequency, and changing the first frequency to the third frequency when a specific application terminates on the electronic device.

In one example embodiment, the method may further include: determining whether the electronic device is placed in a strong electric field area; and maintaining, when the electronic device is placed in a strong electric field area, the first frequency although the first frequency interferes with the second frequency.

In one example embodiment, determining whether the electronic device is placed in a strong electric field area may include determining that the electronic device is placed in a strong electric field area when the absolute value of the signal sensitivity associated with the second frequency is greater than or equal to a second threshold.

In a feature of the disclosure, the method for avoiding interference between frequencies enables the electronic device to change the system frequency so as not to interfere with radio frequencies used for various wireless communication activities, preventing degradation of wireless communication performance.

Hereinabove, an electronic device and a method for avoiding interference between frequencies therefor have been described as various example embodiments of the disclosure with reference to the accompanying drawings. Specific terms or words used in the description should be construed in accordance with the spirit of the disclosure without limiting the subject matter thereof. It should be understood that many variations and modifications of the basic concept described herein will still fall within the spirit and scope of the disclosure as defined in the appended claims and their equivalents.

What is claimed is:

1. An electronic device comprising:
   a housing;
   a wireless communication circuit arranged in the housing;
   at least one electronic component arranged in the housing;
   a processor electrically connected with the wireless communication circuit and the at least one electronic component; and
   a memory electrically connected with the processor,
   wherein the memory stores instructions that, when executed, cause the processor to detect occurrence of an interrupt, to search for a base station in response to detecting of the interrupt, to receive information on an idle channel from the base station, to connect to the idle channel on the basis of the received information, to send or receive a signal to or from the at least one electronic component using a first frequency, and to determine whether to change the first frequency in consideration of a second frequency associated with the connected channel.

2. The electronic device of claim 1, wherein the instructions cause the processor to determine whether the first frequency and the second frequency interfere with each other, to change the first frequency to a third frequency, when the first frequency and the second frequency interfere with each other, and to maintain the first frequency, when the first frequency and the second frequency do not interfere with each other.

3. The electronic device of claim 1, wherein the memory stores data associating the first frequency and the second frequency, and wherein the instructions cause the processor to determine whether to change the first frequency based on the stored data.

4. The electronic device of claim 1, further comprising an embedded SIM (eSIM) card electrically connected with the wireless communication circuit, wherein the instructions cause the processor to determine the second frequency based on the eSIM card and to determine whether to change the first frequency by comparing the first frequency with the second frequency.

5. A method for operating an electronic device, comprising:
   performing communication between electronic components of the electronic device using a first frequency;
   detecting occurrence of an interrupt;
   searching for a base station in response to detecting of the interrupt;
   receiving information on an idle channel from the base station;
   connecting to the idle channel on the basis of the received information;
   identifying a second frequency associated with the connected channel;
   determining whether the first frequency interferes with the second frequency; and
   changing, upon determining that the first frequency interferes with the second frequency, the first frequency to a third frequency.

6. The method of claim 5, wherein determining whether the first frequency interferes with the second frequency comprises examining data describing an interference relationship between the first frequency and the second frequency.

7. The method of claim 5, wherein determining whether the first frequency interferes with the second frequency comprises determining that the first frequency interferes with the second frequency when an absolute value of the signal sensitivity associated with the second frequency is less than or equal to a first threshold.

8. The method of claim 5, wherein changing the first frequency comprises changing, after determining that the first frequency interferes with the second frequency, the first frequency to the third frequency when the electronic device enters sleep mode.

9. The method of claim 5, wherein changing the first frequency comprises changing, after determining that the first frequency interferes with the second frequency, the first frequency to the third frequency when a specific application terminates on the electronic device.

10. The method of claim 5, further comprising:
    determining whether the electronic device is placed in a strong electric field area; and
    maintaining, when the electronic device is placed in a strong electric field area, the first frequency although the first frequency interferes with the second frequency,
    wherein determining whether the electronic device is placed in a strong electric field area comprises determining that the electronic device is placed in a strong electric field area when an absolute value of the signal sensitivity associated with the second frequency is greater than or equal to a threshold.

11. An electronic device comprising:
    a housing;
    a wireless communication circuit arranged in the housing;
    at least one electronic component arranged in the housing;
    a processor electrically connected with the wireless communication circuit and the at least one electronic component; and
    a memory electrically connected with the processor, wherein the memory stores instructions that, when executed, cause the processor to communicate with the at least one electronic component using a first frequency, to detect occurrence of an interrupt, to search for a base station in response to detecting of the interrupt, to receive information on an idle channel from the base station, to connect to the idle channel on the basis of the received information, to identify a second frequency associated with the connected channel, to determine whether the first frequency and the second frequency interfere with each other, and to change the first frequency to a third frequency when the first frequency and the second frequency interfere with each other.

12. The electronic device of claim 11, wherein the second frequency is used to send or receive a signal to or from an external device.

13. The electronic device of claim 11, wherein the instructions cause the processor to identify the second frequency based on information received from a base station.

14. The electronic device of claim 11, wherein the interrupt corresponds to at least one of booting of the electronic device, handover, SIM card insertion, roaming, opening, configuration change, GNSS activation, and WLAN activation.

15. The electronic device of claim 11, wherein the memory stores data of a relationship of interference between the first frequency and the second frequency.

16. The electronic device of claim 11, wherein the instructions cause the processor to determine that the first frequency and the second frequency interfere with each other when an absolute value of the signal sensitivity associated with the second frequency is less than or equal to a threshold.

17. The electronic device of claim 11, wherein the instructions cause the processor to determine that the first frequency and the second frequency interfere with each other, and to change the first frequency to the third frequency when the electronic device is in sleep mode or a specific application terminates execution on the electronic device.

18. The electronic device of claim 11, wherein the instructions cause the processor to determine whether the electronic device is placed in a strong electric field area, and to maintain, upon determining that the electronic device is placed in a strong electric field area, the first frequency although the first frequency and the second frequency have been determined to interfere with each other.

19. The electronic device of claim 18, wherein the instructions cause the processor to determine that the electronic device is placed in a strong electric field area when an absolute value of the signal sensitivity associated with the second frequency is greater than or equal to a threshold.

20. A non-transitory computer readable storage medium storing a program that when executed causes a processor of an electronic device to perform a method for avoiding interference between frequencies in an electronic device, wherein the program is configured to perform a method comprising communication among electronic components using a first frequency, detect occurrence of an interrupt, search for a base station in response to detecting of the interrupt, receive information on an idle channel from the base station, connect to the idle channel on the basis of the received information, identify a second frequency associated with the connected channel, determine whether the first frequency and the second frequency interfere with each other, and change the first frequency to a third frequency upon determining that the first frequency and the second frequency interfere with each other.

* * * * *